Figure 1:
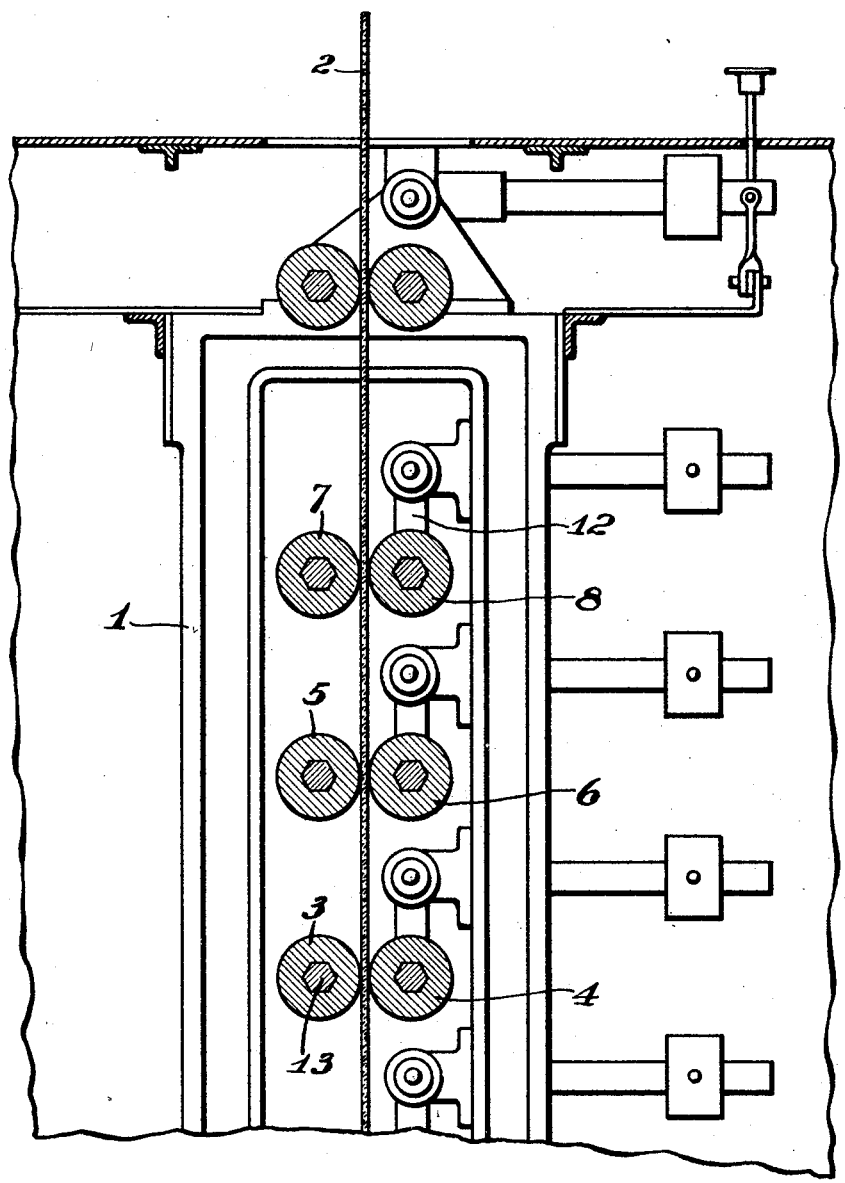

May 23, 1933.  H. L. HALBACH  1,909,948
APPARATUS FOR DRAWING GLASS
Filed June 23, 1932  2 Sheets-Sheet 1

INVENTOR
Howard L. Halbach
by
Bakewell & Bee
Attys

May 23, 1933.                 H. L. HALBACH                    1,909,948
                        APPARATUS FOR DRAWING GLASS
                   Filed June 23, 1932        2 Sheets-Sheet 2
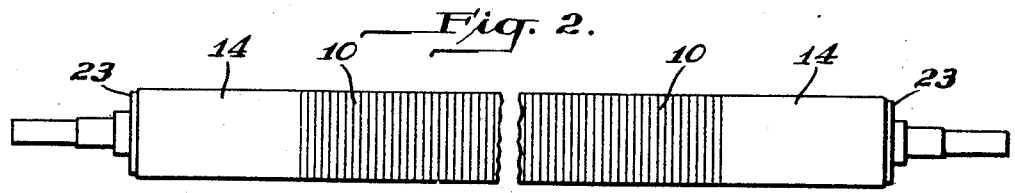
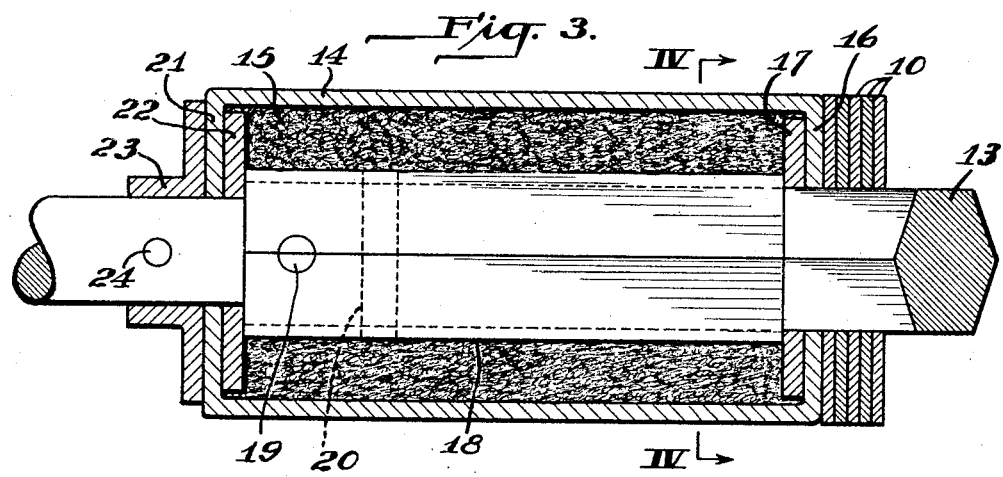
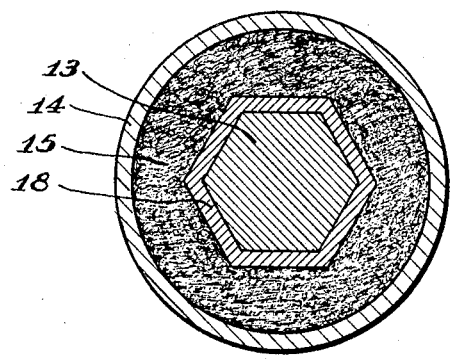
INVENTOR
Howard L. Halbach
by
Bradley & Bee
attys.

Patented May 23, 1933

1,909,948

UNITED STATES PATENT OFFICE

HOWARD L. HALBACH, OF CLARKSBURG, WEST VIRGINIA, ASSIGNOR TO PITTSBURGH PLATE GLASS COMPANY, A CORPORATION OF PENNSYLVANIA

APPARATUS FOR DRAWING GLASS

Application filed June 23, 1932. Serial No. 618,879.

The invention relates to apparatus for drawing glass upwardly in a continuous sheet or ribbon, such as is done in the well-known Fourcault system. This apparatus employs a series of pairs of driven rolls having surfaces of somewhat yielding material usually made by placing discs of molded asbestos side by side on a hexagonal shaft. Due to the methods employed in forming the sheet, the edges often vary in thickness, as compared with the central portion of the sheet, such edges ordinarily being somewhat thickened forming beads. The gripping force as applied by the rolls is thus greater at the edges of the sheet and proper traction is not applied over the body of the sheet between the edges so that slippage results, and more pressure must be applied by the rolls to draw the glass than would be the case if the sheet were uniformly gripped between the rolls throughout its width. The danger of breakage increases with the pressure applied to the rolls. One of the objects of the invention is to overcome this difficulty and provide rolls which give uniform traction throughout their width despite the fact that the sheet may have a bead formation at its edges. A further object is to provide a roll construction which will prevent small chips of glass or strips which break away from the edges of the sheet from working their way downward through the leer causing scratches and breakage and spoiling the glass bath from which the sheet is drawn. One embodiment of the invention is illustrated in the accompanying drawings, wherein:

Figure 1 is a vertical section through the upper portion of a glass drawing apparatus in which the improved roll construction is included. Fig. 2 is a side elevation of one of the rolls. Fig. 3 is a longitudinal section through the end of one of the rolls. And Fig. 4 is a transverse section on the line IV—IV of Fig. 3.

Referring to the drawings, 1 is a supporting framework engaging the opposite surfaces of the continuous glass sheet or ribbon 2 which is being drawn. The rolls are suitably driven by means not shown and one set of rolls is mounted for movement toward and from the other set, the rolls 4, 6 and 8 lying to the right of the glass sheet, being in this case the movable set and 3, 5 and 7 the fixed set. These rolls are mounted upon the counterweighted bell crank levers 12, so that the required degree of pressure between the two sets of rolls is secured, this being a detail of construction well-known in the art as is also the method of driving the rolls.

The construction of the rolls to which the invention particularly relates will be seen by reference to Figs. 2, 3 and 4. Each roll includes a metal shaft 13, preferably of hexagonal cross section carrying for the greater part of its length the series of discs 10, such discs being preferably of molded asbestos composition clamped tightly together so that their outer peripheries constitute a continuous cylindrical surface. The end portions of the rolls comprise cylindrical sleeves 14 of asbestos fabric backed up by a body of yielding fibrous material 15, such as steel wool. Any other yielding supporting means might be provided in place of the steel wool, such as asbestos wool, glass wool, or a spring supporting means. The inner end 16 of the sleeve is turned in as indicated in Fig. 3 and is clamped between the end disc 10 and a metal washer 17. The washer is held in position by a sleeve 18 fitting the shaft 13 and secured in position by means of pins 19 and 20 which extend through the sleeve and through the shaft. The outer end of the sleeve 14 is also turned in as indicated at 21 and clamped between the metal washer 22 and the collar 23 which is secured against longitudinal movement upon the shaft by any suitable means, such as the pin 24.

The end portions of the rolls comprising the asbestos sleeves 14 backed up by the yielding fibrous material engage the edges of the sheet being drawn, while the body portion of the roll consisting of the series of discs 25 grip the glass sheet intermediate its edges. The molded asbestos material constituting the discs 25 is slightly yielding so that they give a good grip upon the glass and will not injure its surface while the sleeves 14 are much more yielding and, therefore, have no tendency to apply undue pressure to the thickened or bulbous edges of the sheet. Proper traction is thus applied to the sheet from edge to edge without any tendency to break the sheet due to the application of uneven pressure. In case the edges of the sheet separate by reason of cracks extending longitudinally of the sheet, the yielding end portions grip these separated portions of the sheet and carry them up through the leer instead of permitting them to drop back into the bath. The yielding end sections of the roll also tend to prevent any small pieces of glass or chips from working down along the edges of the sheet and scratching the sheet or finding their way into the bath beneath. Other advantages incident to the construction will be readily apparent to those skilled in the art. A further advantage results from the fact that the soft roll ends act as seats and eliminate any circulation of air along the sheet at the edges such as occurs with a sheet having bulb edges engaged by a relatively unyielding roll. The circulation of air has an adverse effect as it tends to harden the edges making the glass more difficult to cut and causing breakage.

What I claim is:

1. In combination in glass drawing apparatus, a plurality of sets of traction rolls, arranged in series for gripping the glass therebetween, such rolls having their body portion of molded refractory material and their end portions which engage the edges of the sheet being drawn of relatively soft yielding material.

2. In combination in glass drawing apparatus, a plurality of sets of traction rolls, arranged in series for gripping the glass therebetween, such rolls having their body portions of molded refractory material and their end portions which engage the edges of the sheet being drawn of asbestos fabric yieldingly supported.

3. In combination in glass drawing apparatus, a plurality of sets of traction rolls, arranged in series for gripping the glass therebetween, such rolls having their body portion of molded refractory material and their end portions which engage the edges of the sheet being drawn of asbestos fabric backed up by a body of yielding fibrous material.

4. In combination in glass drawing apparatus, a plurality of sets of traction rolls, arranged in series for gripping the glass therebetween, such rolls having their body portions of molded refractory material and their end portions which engage the edges of the sheet being drawn of asbestos fabric backed up by a body of steel wool.

5. In combination in glass drawing apparatus, a plurality of sets of traction rolls, arranged in series for gripping the glass therebetween, such rolls having their body portions of molded refractory material and their end portions which engage the edges of the sheet being drawn consisting of cylindrical sleeves of asbestos fabric filled with yielding fibrous material.

6. In combination in glass drawing apparatus, a plurality of sets of traction rolls, arranged in series for gripping the glass therebetween, such rolls each comprising a shaft on which are mounted a series of discs of molded asbestos composition constituting the body portion of the roll and end portions comprising cylindrical sleeves of asbestos fabric filled with yielding fibrous material.

7. In combination in glass drawing apparatus, a plurality of sets of traction rolls, arranged in series for gripping the glass therebetween, such rolls each comprising a shaft on which are mounted a series of discs of molded asbestos composition constituting the body portion of the roll, metal sleeves on the shaft at the end of the body portion, a clamping disc carried on the shaft at each end of the metal sleeves, sleeves of asbestos fabric fitting over the clamping discs with their end edges lying along the outer sides of such clamping discs, clamping means on the shaft at the outer ends of the asbestos sleeves engaging the outer end edges thereof, and yielding supporting means lying inside the asbestos sleeves.

In testimony whereof, I have hereunto subscribed my name this 15 day of June, 1932.

HOWARD L. HALBACH.